(12) United States Patent
Leong et al.

(10) Patent No.: US 7,638,982 B2
(45) Date of Patent: Dec. 29, 2009

(54) SWITCHED CAPACITOR REGULATOR FOR DRIVING HIGH LOAD CURRENT

(75) Inventors: Kong-Yin Leong, Singapore (SG); Ravi Shanker, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 298 days.

(21) Appl. No.: 11/520,491

(22) Filed: Sep. 13, 2006

(65) Prior Publication Data

US 2007/0210781 A1  Sep. 13, 2007

(30) Foreign Application Priority Data

Sep. 16, 2005  (SG)  ............... 200505995-1

(51) Int. Cl.
*H02J 7/00* (2006.01)
(52) U.S. Cl. .............. 320/166; 320/167; 307/109; 307/110
(58) Field of Classification Search ........ 320/166, 320/167; 307/109, 110
See application file for complete search history.

(56) References Cited

U.S. PATENT DOCUMENTS 6,586,899 B2 * 7/2003 Joch .................. 318/434

OTHER PUBLICATIONS

Henry Chung, S.Y.R. Hui, S. C. Tang, "Design and Analysis of Multi-Stage Switched-Capacitor-Based Step-Down DC/DC Converters", IEEE Transactions, 1998, pp. 1655-1661.
Wei-Chung Wu, Richards M. Bass, "Analysis of Charge Pumps Using Charge Balance", IEEE Transactions, 2000, pp. 1491-1496.

* cited by examiner

*Primary Examiner*—Edward Tso
*Assistant Examiner*—Samuel Berhanu
(74) *Attorney, Agent, or Firm*—Lisa K. Jorgenson; William A. Munck

(57) ABSTRACT

A switched capacitor regulator in accordance with the present invention comprises a DC voltage source, a plurality of switches, a pumping capacitor, and a load capacitor. The plurality of switches may comprise semiconductor switches implemented in an integrated circuit (IC). The plurality of switches is configured to operate the switched capacitor regulator to place the regulator into a first charging stage and, alternately, a second charging stage. The switching between the first stage and the second stage results in the pumping capacitor being charged in opposing directions, while the load capacitor is always being charged in the same direction. The load capacitor is thus being charged in both the first charging stage and the second charging stage.

19 Claims, 2 Drawing Sheets

SWITCHED CAPACITOR REGULATOR FOR DRIVING HIGH LOAD CURRENT

CROSS-REFERENCE TO RELATED APPLICATION AND CLAIM OF PRIORITY

The present application is related to Singapore Patent No. 200505995-1 filed Sep. 16, 2005, entitled "SWITCHED CAPACITOR REGULATOR FOR DRIVING HIGH LOAD CURRENT AND METHOD THEREOF". Singapore Patent No. 200505995-1 is assigned to the assignee of the present application and is hereby incorporated by reference into the present disclosure as if fully set forth herein. The present application hereby claims priority under 35 U.S.C. §119(a) to Singapore Patent No. 200505995-1.

TECHNICAL FIELD

The present disclosure relates to switched capacitor converters for providing stable voltage sources for sensitive applications. In particular, this disclosure relates to a switched capacitor regulator for driving high load current.

BACKGROUND

Switched capacitor converters are often used as voltage regulators to provide stable voltage sources for low voltage applications. When used in electronic applications having physical size constraints, such switched capacitor converters are often implemented using integrated circuits together with external capacitors.

However, such switched capacitor converters are limited to providing low load currents for the low voltage applications. With emerging low voltage applications requiring higher load currents to drive more demanding applications, conventional switched capacitor converters are simply unable to deliver the higher load currents required.

One example of a conventional low voltage application requiring higher load currents is miniature hard disk drives, such as the IBM Microdrive. Such miniature hard disk drives are typically low voltage devices having a processor powered by a switch capacitor converter. The switched capacitor converter in miniature hard disk drives is also necessarily smaller than typical converters.

An example of one implementation of a conventional switched capacitor converter is shown in FIG. 1. The circuit includes pumping capacitor 15, load capacitor 17, two pairs of semiconductor switches (11, 14 & 12, 13) and DC voltage source 22. Switched capacitor converter 10 operates on the principle of charge balance transfer. The two pairs of semiconductor switches (11, 14 & 12, 13) are configured to operate switched capacitor converter 10 by continuously alternating between a charging stage and a discharging stage.

In the charging stage, the first pair of semiconductor switches (11, 14) are closed, and the second pair of semiconductor switches (12, 13) are opened, coupling DC voltage source 22 to pumping capacitor 15. Pumping capacitor 15 is further coupled in series to load capacitor 17. Thus, in the charging state both capacitors, pumping capacitor 15 and load capacitor 17, are charged.

In the discharging stage, the first pair of semiconductor switches (11, 14) are opened, and the second pair of semiconductor switches (12, 13) are closed, de-coupling pumping capacitor 15 from DC voltage source 22. Pumping capacitor 15 remains coupled to load capacitor 17. In this stage, pumping capacitor 15 discharges to load capacitor 17, while load capacitor 17 continues to provide current to the attached application. The continuous alternating charging and discharging stages of conventional switched capacitor converter 10 regulates the desired voltage of the attached application.

Conventional switched capacitor converters allow for only low load currents to be drawn by the application. Increasing the ratings of pumping capacitor 15 and load capacitor 17 allow higher load currents and results in the increase of the physical size of pumping capacitor 15 and load capacitor 17 and the overall architecture.

Other implementations of conventional switched capacitor converter include adding additional pumping capacitors by cascading them and having additional semiconductor switches to couple them together during the charging and discharging phases. However, such implementations require the use of more semiconductor switches and also an increase in the physical size of the overall architecture.

Therefore, there is a need for an improved switched capacitor converter architecture having size constraints for driving high load currents for low voltage applications.

SUMMARY

The present disclosure seeks to provide a switched capacitor regulator for driving high load currents.

In one embodiment, the present disclosure provides a switched capacitor regulator for driving high load currents from a DC voltage source. The switched capacitor regulator includes a pumping capacitor, a load capacitor, and a plurality of switches. The plurality of switches are configured to place the regulator into a first charging stage and, alternately, a second charging stage. In the first charging stage, the DC voltage source is coupled in series to the pumping capacitor which is further coupled in series with the load capacitor such that current from the DC voltage source charges the pumping capacitor and the load capacitor in a first direction.

In another embodiment, the present disclosure provides a method for operating a switched capacitor regulator having a pumping capacitor, a load capacitor, and a plurality of switches. The plurality of switches is configured to place the regulator into a first charging stage and, alternately, a second charging stage. The method includes placing the regulator into the first charging stage by coupling a DC voltage source to the pumping capacitor which is further coupled in series to the load capacitor. The method also includes placing the regulator into the second charging stage by coupling the DC voltage source to the pumping capacitor which is further coupled in series to the load capacitor. In the first charging stage, current from the DC voltage source charges the pumping capacitor and the load capacitor in a first direction.

In still another embodiment, the present disclosure provides a switched capacitor regulator for driving high load currents from a DC voltage source including a first switch, a second switch, a third switch, a fourth switch, a pumping capacitor, and a load capacitor. The DC voltage source is coupled to a first end of the pumping capacitor via the first switch. The DC voltage source is further coupled to a second end of the pumping capacitor via the second switch. The first end of the pumping capacitor is further coupled to a first end of the load capacitor via a third switch. The second end of the pumping capacitor is further coupled to the first end of the load capacitor via a fourth switch. The first switch and the fourth switch are closed and the second and third switch are opened to place the regulator into a first charging stage. The second and third switch are closed and the first and the fourth switch are opened to place the regulator into a second charging stage.

In yet another embodiment, the present disclosure provides a system for driving high load currents, a switched capacitor regulator, DC voltage source, and a low voltage application. The switched capacitor regulator includes a pumping capacitor, a load capacitor, and a plurality of switches. The plurality of switches are configured to place the regulator into a first charging stage and, alternately, a second charging stage. In the first charging stage, the DC voltage source is coupled in series to the pumping capacitor which is further coupled in series with the load capacitor such that current from the DC voltage source charges the pumping capacitor and the load capacitor in a first direction.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Switched capacitor regulators used particularly in miniature hard disk drives are often implemented using integrated circuits together with external capacitors. Such switched capacitor regulators are required to drive higher load currents and yet maintain a small physical size.

Figure 1:
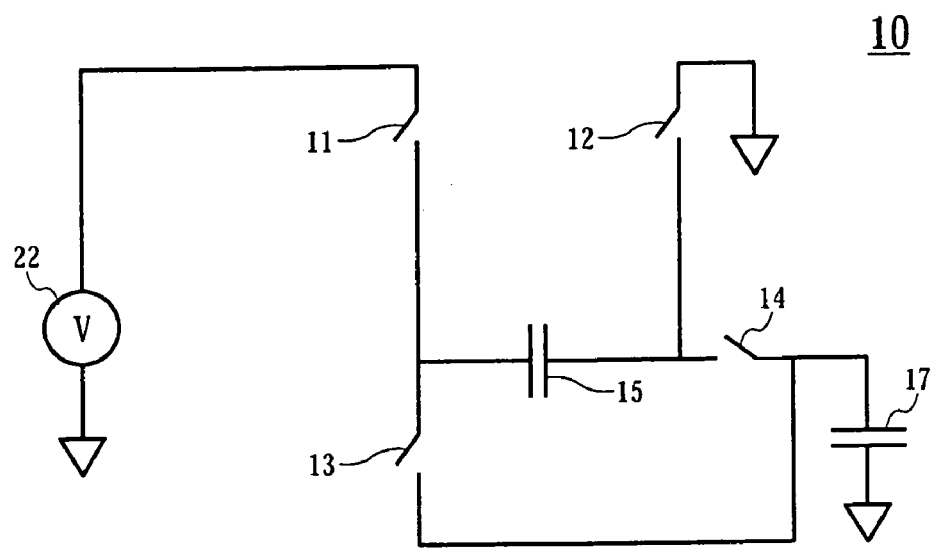
FIG. 1 illustrates a circuit diagram of a conventional switched capacitor converter.
Figure 2:
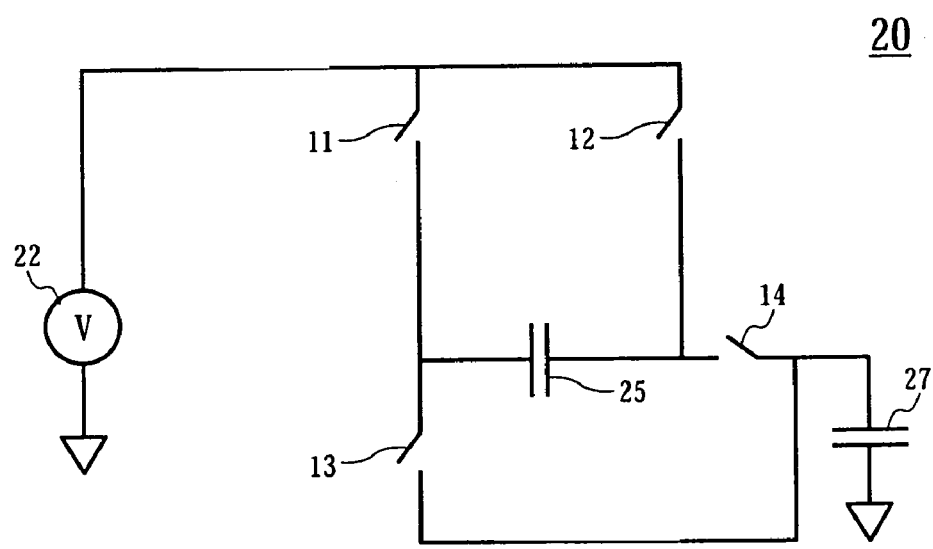
FIG. 2 illustrates a circuit diagram of a switched capacitor regulator for driving higher load current in accordance with one embodiment of the present disclosure.
Figure 3:
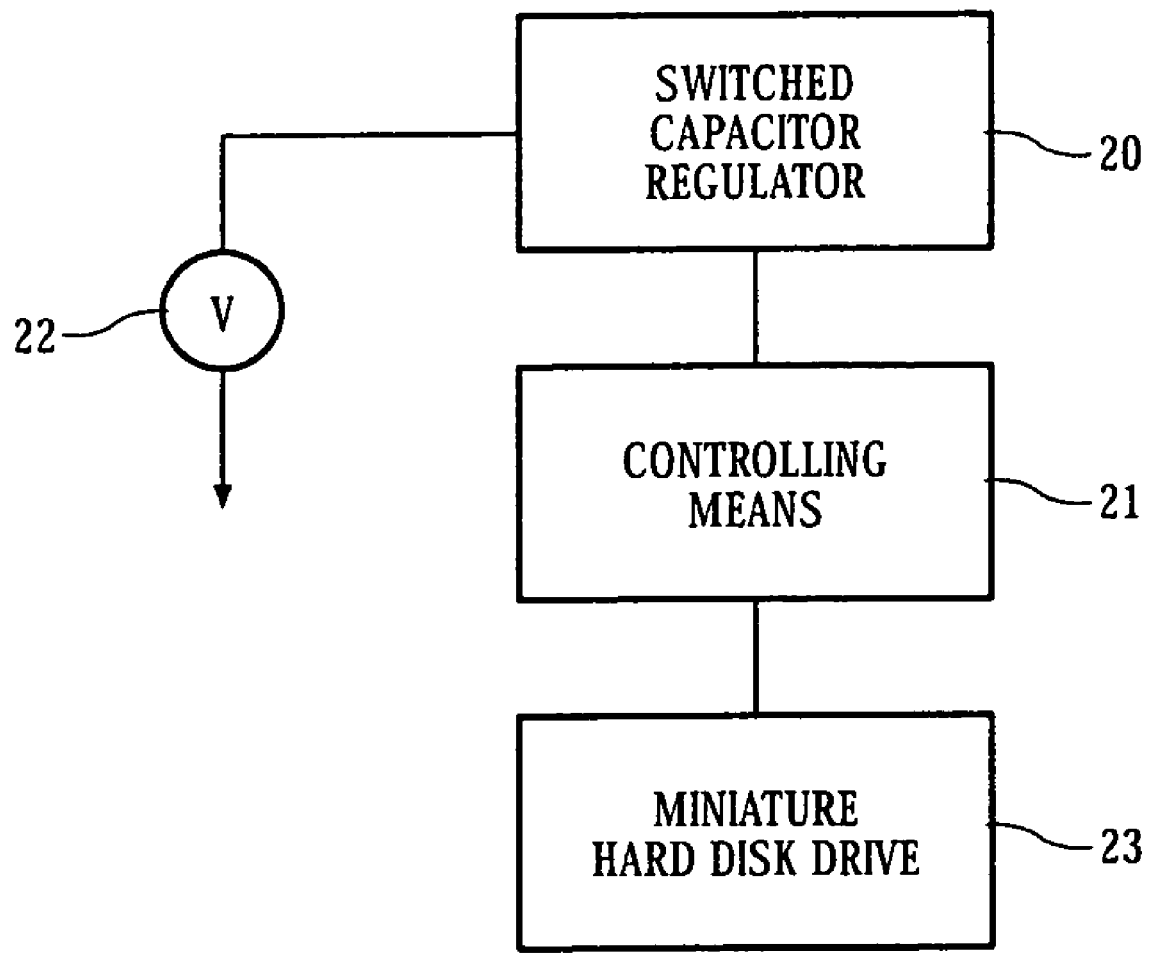
FIG. 3 illustrates a block diagram of a system having the switched capacitor regulator in accordance with one embodiment of the present disclosure.

Referring to FIG. 2, switched capacitor regulator 20 in accordance with one embodiment of the present disclosure comprises DC voltage source 22, a plurality of switches 11, 12, 13, 14 a pumping capacitor 25 and a load capacitor 27. Switched capacitor regulator 20 may be implemented in a variety of different low voltage applications. For example, switched capacitor regulator 20 may be in an application such as controller 21 for a miniature hard disk drive 22.

A plurality of switches 11, 12, 13 and 14 may comprise semiconductor switches implemented in an integrated circuit (IC). Switches 11, 12, 13 and 14, are configured to operate switched capacitor regulator 20 continuously alternating between a first charging stage and a second charging stage. Switches 11, 12, 13, and 14 are controlled linearly when connected to both the first charging stage and the second charging stage. Switched capacitor regulator 20 essentially has an H bridge circuit configuration. DC voltage source 22 is coupled to a first end of pumping capacitor 25 via a first switch 11. DC voltage source 22 is further coupled to a second end of pumping capacitor 25 via second switch 12. The first end and the second end of pumping capacitor 25 are further coupled to a first end of load capacitor 27 via a third switch 13 and a fourth switch 14 respectively. The second end of load capacitor 27 is grounded.

A method of operating switched capacitor regulator 20 includes the steps of alternately connecting between a first charging stage and a second charging stage. In the first charging stage, first switch 11 and fourth switch 14 are closed, while second switch 12 and third switch 13 are open. DC voltage source 22 is thus coupled in series to pumping capacitor 25 via first switch 11. Pumping capacitor 25 is further coupled in series via fourth switch 14 to load capacitor 27.

In the first charging stage, current flows from DC voltage source 22 and charges pumping capacitor 25 and load capacitor 27 in a first direction. In the second charging state, second switch 12 and third switch 13 are open, while first switch 11 and fourth switch 14 are open. DC voltage source 22 is now coupled in series to pumping capacitor 25 via second switch 12. Pumping capacitor 25 is further coupled in series via third switch 13 to load capacitor 27. Pumping capacitor 25 is however coupled to DC voltage source 22 in an opposing direction from that of the first charging stage. Load capacitor 27 continues to receive current from DC voltage source 22 in the same direction as in the first charging stage. In the second charging stage, current flows from DC voltage source 22 and charges pumping capacitor 25 and load capacitor 27, albeit pumping capacitor 25 is charged in an opposing second direction while load capacitor 27 is charged in the first direction.

In switched capacitor regulator 20 of the present invention, the switching between the first stage and the second stage results in pumping capacitor 25 being charged in opposing directions, while load capacitor 27 is always being charged in the same direction. Load capacitor 27 is thus being charged in both the first charging stage and the second charging stage. A higher load current can thus be advantageously drawn from switched capacitor regulator 20 of the present disclosure, as the current can directly be drawn from DC voltage source 22 and there is less reliance on pumping capacitor 25. In embodiments in accordance with the present disclosure, the capacity of pumping capacitor 25 is greatly reduced as it acts mainly as a buffer in switched capacitor regulator 20.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A switched capacitor regulator for driving high load currents from a DC voltage source comprising:

a pumping capacitor;

a load capacitor; and a plurality of switches configured to place the regulator into a first charging stage and, alternately, a second charging stage, wherein in the first charging stage, the DC voltage source is coupled in series with the pumping capacitor which is further coupled in series with the load capacitor such that current from the DC voltage source charges the pumping capacitor and the load capacitor in a first direction, and wherein in the second charging stage, the DC voltage source is coupled in series with the pumping capacitor which is further coupled in series with the load capacitor such that current from the DC voltage source charges the pumping capacitor in a second direction opposing the first direction and the load capacitor in the first direction.

2. The switched capacitor regulator of claim 1, wherein the switched capacitor regulator has an H bridge circuit configuration.

3. The switched capacitor regulator of claim 1, wherein the plurality of switches comprises a first switch, a second switch, a third switch and a fourth switch.

4. The switched capacitor regulator of claim 3, wherein the DC voltage source is coupled to a first end of the pumping capacitor via the first switch,
wherein the DC voltage source is further coupled to a second end of the pumping capacitor via the second switch,
wherein the first end of the pumping capacitor is further coupled to a first end of the load capacitor via a third switch, and
wherein the second end of the pumping capacitor is further coupled to the first end of the load capacitor via a fourth switch.

5. The switched capacitor regulator of claim 3, wherein the first switch and the fourth switch are closed and the second and third switch are opened to place the regulator into the first charging stage,
wherein the second and third switch are closed and the first and the fourth switch are opened to place the regulator into the second charging stage.

6. A method for operating a switched capacitor regulator having a pumping capacitor, a load capacitor, and a plurality of switches, the plurality of switches being configured to place the regulator into a first charging stage and, alternately, a second charging stage, the method comprising the steps:
placing the regulator into the first charging stage by coupling a DC voltage source to the pumping capacitor which is further coupled in series to the load capacitor; and
placing the regulator into the second charging stage by coupling the DC voltage source to the pumping capacitor which is further coupled in series to the load capacitor,
wherein in the first charging stage, current from the DC voltage source charges the pumping capacitor and the load capacitor in a first direction, and
wherein in the second charging stage, current from the DC voltage source charges the pumping capacitor in a second direction opposing the first direction and the load capacitor in the first direction.

7. The method of claim 6, wherein the switched capacitor regulator has an H bridge circuit configuration.

8. The method of claim 6, wherein the plurality of switches comprises a first switch, a second switch, a third switch and a fourth switch.

9. The method of claim 8, wherein the DC voltage source is coupled to a first end of the pumping capacitor via the first switch,
wherein the DC voltage source is further coupled to a second end of the pumping capacitor via the second switch,
wherein the first end of the pumping capacitor is further coupled to a first end of the load capacitor via a third switch, and
wherein the second end of the pumping capacitor is further coupled to the first end of the load capacitor via a fourth switch.

10. The method of claim 9, wherein the step of placing the regulator into the first charging state further comprises:
closing the first switch and the fourth switch; and
opening the second switch and the third switch.

11. The method of claim 9, wherein the step of placing the regulator into the second charging stage further comprises:
closing the second switch and the third switch; and
opening the first switch and the fourth switch.

12. A switched capacitor regulator for driving high load currents from a DC voltage source comprising:
a first switch, a second switch, a third switch, a fourth switch;
a pumping capacitor; and
a load capacitor,
wherein the DC voltage source is coupled to a first end of the pumping capacitor via the first switch,
wherein the DC voltage source is further coupled to a second end of the pumping capacitor via the second switch,
wherein the first end of the pumping capacitor is further coupled to a first end of the load capacitor via a third switch,
wherein the second end of the pumping capacitor is further coupled to the first end of the load capacitor via a fourth switch,
wherein the first switch and the fourth switch are closed and the second and third switch are opened to place the regulator into a first charging stage,
wherein the second and third switch are closed and the first and the fourth switch are opened to place the regulator into a second charging stage, and
wherein, when the regulator is the first charging stage, the DC voltage source is coupled to the pumping capacitor which is further coupled in series with the load capacitor such that current from the DC voltage source charges the pumping capacitor and the load capacitor in a first direction and, when the regulator is in the second charging stage, the DC voltage source is coupled in series with the pumping capacitor which is further coupled in series with the load capacitor such that current from the DC voltage source charges the pumping capacitor in an opposing second direction and the load capacitor in the first direction.

13. The switched capacitor regulator of claim 12, wherein the switched capacitor regulator forms a portion of a controller for a miniature hard disk drive.

14. The switched capacitor regulator of claim 12, wherein the switched capacitor regulator has an H bridge circuit configuration.

15. A system for driving high load currents comprising:
a switched capacitor regulator;
a DC voltage source; and
a low voltage application,
wherein the switched capacitor regulator comprises: a pumping capacitor; a load capacitor; and a plurality of switches configured to place the regulator into a first charging stage and, a second charging stage,
wherein in the first charging stage, the DC voltage source is coupled in series with the pumping capacitor which is further coupled in series with the load capacitor such that current from the DC voltage source charges the pumping capacitor and the load capacitor in a first direction, and
wherein in the second charging stage, the DC voltage source is coupled in series with the pumping capacitor which is further coupled in series with the load capacitor such that current from the DC voltage source charges the pumping capacitor in a second direction opposing the first direction and the load capacitor in the first direction.

16. The system of claim 15, wherein the plurality of switches comprises a first switch, a second switch, a third switch and a fourth switch.

17. The system of claim 16, wherein the DC voltage source is coupled to a first end of the pumping capacitor via the first switch, wherein the DC voltage source is further coupled to a second end of the pumping capacitor via the second switch, wherein the first end of the pumping capacitor is further coupled to a first end of the load capacitor via a third switch, and wherein the second end of the pumping capacitor is further coupled to the first end of the load capacitor via a fourth switch.

18. The system of claim 17, wherein the first switch and the fourth switch are closed and the second and third switch are opened to place the regulator into a first charging stage, and wherein the second and third switch are closed and the first and the fourth switch are opened to place the regulator into a second charging stage.

19. The system of claim 15, wherein the low voltage application comprises a controlling means for a miniature hard disk drive.

* * * * *

UNITED STATES PATENT AND TRADEMARK OFFICE
CERTIFICATE OF CORRECTION

PATENT NO.       : 7,638,982 B2                           Page 1 of 1
APPLICATION NO.  : 11/520491
DATED            : December 29, 2009
INVENTOR(S)      : Leong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 405 days.

Signed and Sealed this

Twenty-first Day of December, 2010

David J. Kappos
*Director of the United States Patent and Trademark Office*